United States Patent
Tseng

(10) Patent No.: US 6,390,671 B1
(45) Date of Patent: May 21, 2002

(54) PROBE COVER WITH FILM INSERT

(75) Inventor: Daniel (Chao Man) Tseng, Taipei (TW)

(73) Assignee: K-Jump Health Co., Ltd., Taipei (TW)

( * ) Notice: Subject to any disclaimer, the term of this patent is extended or adjusted under 35 U.S.C. 154(b) by 0 days.

(21) Appl. No.: 09/562,238

(22) Filed: Apr. 28, 2000

(51) Int. Cl.⁷ ................................................ G01K 1/12
(52) U.S. Cl. ...................... 374/158; 600/474; 600/121
(58) Field of Search .................. 374/158; 600/121, 600/184, 186, 549, 474

(56) References Cited

U.S. PATENT DOCUMENTS

| | | | |
|---|---|---|---|
| 4,062,239 A | * 12/1977 | Fowler et al. | 73/343 R |
| 4,602,642 A | 7/1986 | O'Hara et al. | 128/664 |
| 4,662,360 A | 5/1987 | O'Hara et al. | 128/9 |
| 4,790,324 A | 12/1988 | O'Hara et al. | 128/664 |
| D303,008 S | 8/1989 | O'Hara et al. | D24/18 |
| 4,911,559 A | 3/1990 | Meyst et al. | 374/158 |
| 5,088,834 A | 2/1992 | Howe et al. | 374/158 |
| 5,163,418 A | 11/1992 | Fraden et al. | 128/9 |
| 5,179,936 A | 1/1993 | O'Hara et al. | 128/9 |
| 5,795,067 A | 8/1998 | Fraden et al. | 374/158 |
| 5,906,437 A | 5/1999 | Lin | 374/158 |
| 5,991,652 A | 11/1999 | Barthelemy et al. | 600/474 |
| 6,022,140 A | 2/2000 | Fraden et al. | 374/158 |
| 6,152,596 A | * 11/2000 | Fraden | 374/158 |
| 6,224,543 B1 | * 1/2001 | Gammons et al. | 600/124 |

* cited by examiner

Primary Examiner—Diego Gutierrez
Assistant Examiner—Gail Verbitsky
(74) Attorney, Agent, or Firm—Olson & Hierl, Ltd.

(57) ABSTRACT

A cover for the probe of an infrared thermometer including a sheath having a distal opening and a transparent infrared radiation window defined by a separate film insert which is secured to the interior surface thereof and covers the distal opening. The film insert comprises a strip of film material in one embodiment and a campanulate insert in a second embodiment.

7 Claims, 3 Drawing Sheets

PROBE COVER WITH FILM INSERT

FIELD OF THE INVENTION

This invention relates to a cover for the probe of an infrared radiation thermometer and, more particularly, to a cover which includes a film insert therein.

BACKGROUND OF THE INVENTION

One of the types of thermometers in use today for recording body temperature is the infrared radiation (IR) thermometer. In order to determine body temperature, infrared thermometers use a hollow probe or speculum to establish a radiation pathway between a selected body surface into which the probe is inserted, such as the external ear canal, and a thermal radiation detecting element in the thermometer.

A disposable cover or sheath is normally removably secured over the tip of the probe to provide a clean, sanitary thermometer surface and also to keep the probe tip free of ear wax and hair.

Because the probe cover must be transparent to the infrared radiation being emitted through the tip of the probe, the cover typically incorporates a window in the tip thereof which is made of a material having a thickness less than the thickness of the material which forms the remainder of the cover.

In some of the probe covers, the material forming the infrared window is unitary with the material forming the rest of the cover while, in other covers, the material forming the window comprises a separate strip of film which is bonded or otherwise secured over the tip of the cover.

U.S. Pat. No. 5,088,834 discloses a probe cover where the infrared window and the body of the cover are of unitary construction and injection molded as one unitary piece with the material forming the window having a thickness which is less than the thickness of the material forming the body of the cover.

A disadvantage associated with unitary construction, however, is that current plastic molding apparatus and methods do not allow for the accurate and consistent molding of covers with windows and bodies having thicknesses in the required ranges.

U.S. Pat. No. 4,662,360 discloses a probe cover where the infrared window is made of a separate film of material bonded over the front of the tip of the cover. A disadvantage associated with this two-part probe cover however is that it requires the film comprising the window to be bonded to the cover immediately following the molding of the body to assure an adequate bond. Another disadvantage is that the film comprising the window creates a seam on the exterior of the cover which could be irritating to the ear during use. Yet a further disadvantage is the risk that the film, if not properly bonded, could separate from the cover while the thermometer is being used. Yet another disadvantage is that the material forming the window and the body respectively must preferably be made of the same material to maximize the strength of the thermal bond.

What is thus needed is a probe cover where the separate film of material forming the window is easily and effectively bonded to the interior of the probe cover.

SUMMARY OF THE INVENTION

The present temperature probe cover provides an infrared transparent window bonded to the interior surface of a hollow body of the probe cover. Particularly, the present cover for the temperature probe of a radiation detecting thermometer includes a hollow sheath or body which defines an interior surface, a proximal end opening for receiving the probe, a distal end opening in registry with the transparent end of the probe, and a separate transparent film insert which is secured to the interior surface of the sheath or body and occludes the distal end opening of the sheath to form the radiation transparent window. In one embodiment, the film insert comprises an elongate strip of film material which is adhesively secured to the interior surface of the sheath between the proximal and distal end openings respectively.

Also, in one embodiment, the probe cover includes an annular flange adjacent the proximal end opening thereof and opposed ends of the strip of film material are secured to the flange.

In another embodiment, the film insert is a campanulate insert which is secured to the interior surface of the sheath and occludes the sheath distal end opening.

The method for making the cover of the present invention includes the steps of providing the sheath and the film insert and then securing the film insert to the interior surface of the sheath in a relationship where the film insert covers the distal end opening of the sheath.

In one method embodiment where the film insert is an elongate strip of film material, the step of securing the strip of film material to the interior surface of the sheath includes the step of wrapping and securing the elongate strip of film material around the interior surface of the sheath in a relationship where the ends of the film material are generally diametrically opposed to each other and are secured to the interior surface adjacent the proximal end opening thereof.

Other advantages and features of the present invention which will be more readily apparent from the following detailed description of the preferred embodiment of the invention, the accompanying drawings, and the appended claims.

DETAILED DESCRIPTION OF THE PREFERRED EMBODIMENT

Figure 1:
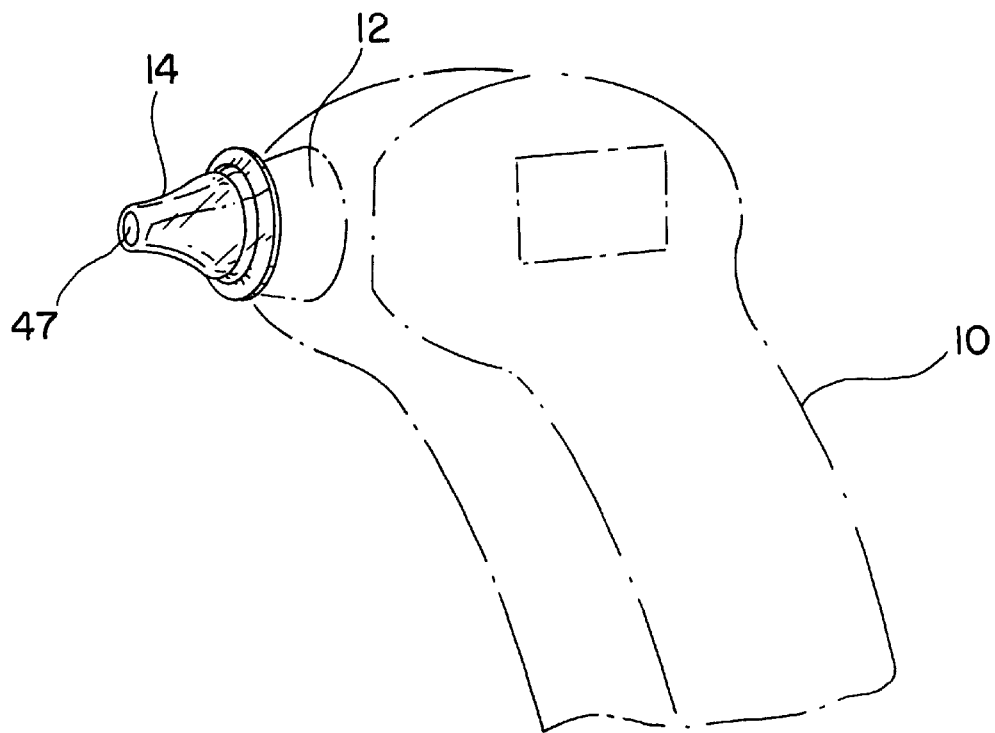
FIG. 1 is a perspective view of an infrared thermometer shown in phantom which has a probe cover constructed in accordance with the present invention and shown mounted over the probe thereof.

The invention disclosed herein is, of course, susceptible of embodiment in many different forms. Shown in the drawings and described below in detail is a preferred embodiment of the invention. It is to be understood, however, that the present disclosure is an exemplification of the principles of the invention and does not limit the invention to the illustrated embodiment.

With reference now to the drawings, and particularly to FIG. 1, there is shown therein an infrared thermometer 10 having an elongated, generally frustroconically shaped probe 12 which is adapted for insertion into a patient's ear (not shown). A disposable probe cover assembly 14 constructed in accordance with the present invention is mounted over the probe 12. The probe 12 includes an interior infrared sensor (not shown) which allows the detection of infrared radiation transmitted along the patient's ear canal to determine a person's body temperature.

Figure 2:
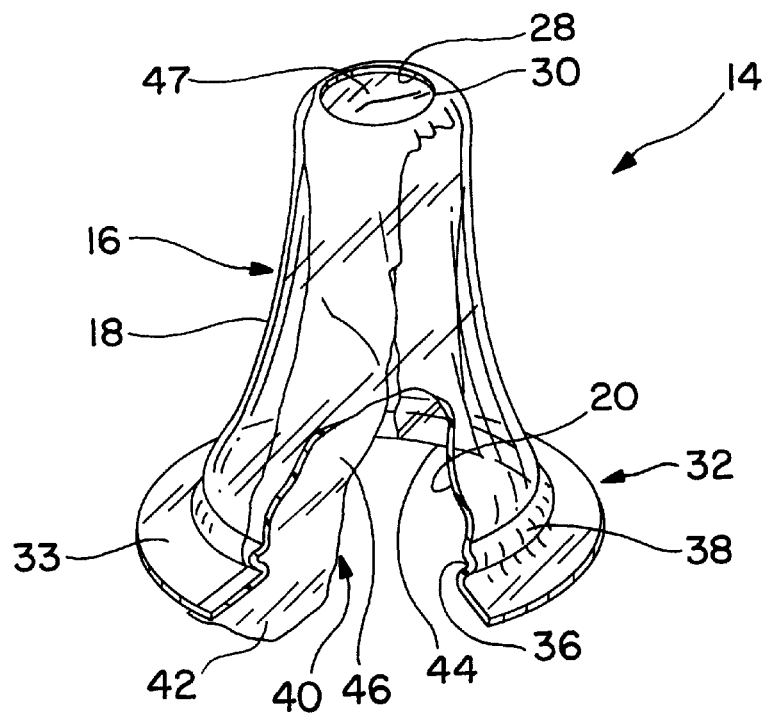
FIG. 2 is an enlarged partially cut-away perspective view of the probe cover of the present invention.
Figure 3:
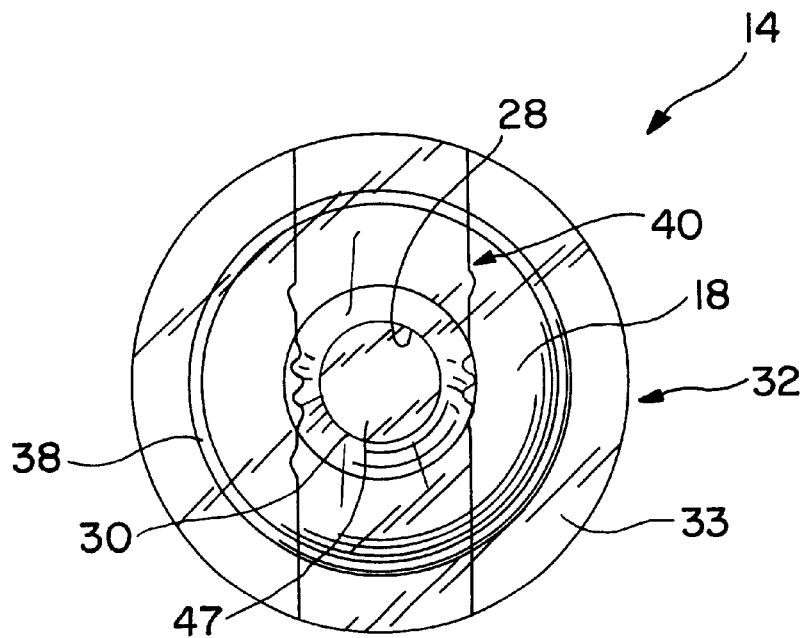
FIG. 3 is an enlarged top plan view of the probe cover of the present invention.
Figure 4:
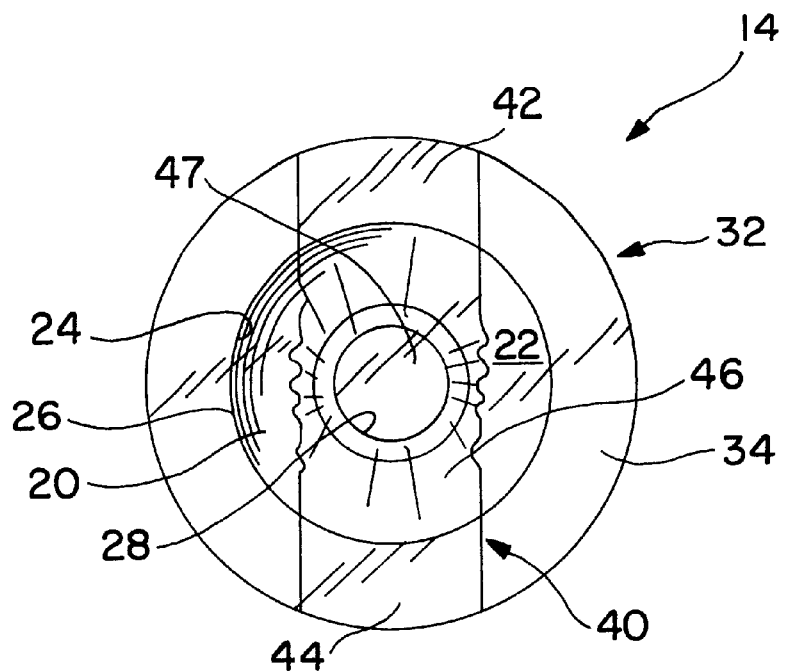
FIG. 4 is an enlarged bottom plan view of the probe cover of the present invention.

As depicted in greater detail in FIGS. 2–4, the probe cover assembly 14 is in the form of a speculum, shaped and sized for insertion into the ear canal. The cover 14 provides a clean, sanitary thermometer surface and also keeps the probe free of ear wax and hair. Particularly, the cover 14 includes a hollow sheath or body member 16 which includes an exterior surface 18 and an interior surface 20 defining a generally frustroconically shaped interior cavity 22.

The interior surface 20 and the cavity 22 together define a generally circular proximal end opening 24 and a peripheral proximal circumferentially extending edge 26 at the proximal end of the body member 16. The interior surface 20 and the cavity 22 additionally together define a distal generally circularly shaped distal end opening 28 and a peripheral distal circumferential edge 30 at the distal end of the body member 16.

An annular flange 32, with top and bottom flat surfaces 33 and 34 respectively, extends unitarily circumferentially around the peripheral proximal edge 26 of the body member 16. The interior surface 20 additionally includes a circumferentially extending groove or recess 36 which forms a circumferentially extending rib 38 on the exterior surface 18 of the body member 16. The rib 16 is located generally parallel to and spaced from the peripheral proximal edge 26 of the body member 16.

The probe cover assembly 14 additionally includes a separate elongate strip of film material 40 which is wrapped around and adhesively secured or bonded to the interior surface 20 of the body member 16. Particularly, the strip of film material 40 includes respective opposed ends 42 and 44 and an elongate body 46 therebetween and is secured to the interior of the cover body member 16 in a relationship where the strip ends 42 and 44 are secured to the flange 32 in a diametrically opposed relationship and the body 46 of the strip of material 40 is secured to the interior surface 20.

More particularly, the film material 40 is bonded to the interior of the body member 16 in a relationship where the strip end 42 is bonded to the bottom surface 34 of the flange 32, the strip body 46 extends upwardly along, and is bonded to, one side of the interior surface 20 of the body member 16, covers the distal end opening 28, then extends downwardly along, and is bonded to, the opposite side of the interior surface 20 of the body member 16, and the strip end 44 is bonded to the bottom surface 34 of the flange 32 in a diametrically opposed relationship to the strip end 42. In accordance with the present invention, the portion of the body 46 of the strip of material 40 covering the distal end opening 28 of the sheath 16 forms the radiation transparent window 47 of the cover 14.

Although the strip of film material 40 is described and shown herein as extending and being bonded to the flange 32, the strip of film material 40 can be made shorter and bonded directly to the interior surface 20 of the body member 16.

Figure 6:
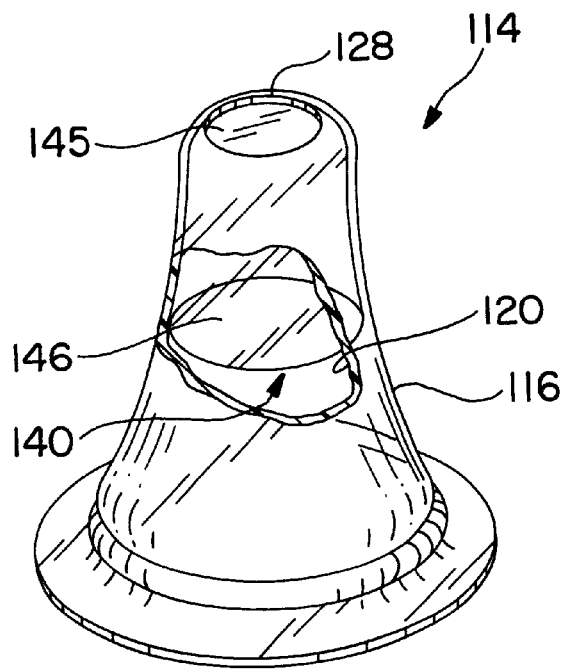
FIG. 6 is an enlarged partially cut-away perspective view of an alternate embodiment of the probe cover of the present invention.

The film material 40 can also be preformed and countered to mate with the interior surface 20, e.g., preformed into an approximation of a transparent, self-centering thimble which is then bonded to the interior surface 20. FIG. 6 illustrates one such alternate embodiment of a probe cover assembly 114 which includes a campanulate or dome-shaped transparent film insert 140 that is received in the cavity which is defined by the interior surface 120 of the body member 116. Particularly, the campanulate insert 140 is received and seated within the body member 116 in a relationship wherein a dome portion 145 of the insert 140 covers the distal end opening 128 of the body member 116 and a generally cylindrical body portion 146 of the insert 140, which is unitary with the dome portion 145, is bonded or otherwise suitably secured to the interior surface 120 of the body member 116.

Unlike the probe cover disclosed in U.S. Pat. No. 4,662, 360, in the present probe cover, the strip of film material 40 is easily and efficiently secured to the interior surface 20 of the sheath 16 using the method described above in a separate manufacturing operation at any time after the sheath or body member 16 has been molded. In a like manner, the insert 140 is easily and efficiently self-centered and secured to the interior surface 120 of the sheath 116 also in a separate manufacturing operation at any time after the sheath or body member 116 has been molded.

Both the body member 16, the strip of film material 40 and the insert 140 are preferably made of a suitable inert, physiologically compatible material such as polypropylene and polyethylene, i.e., plastic materials which are substantially transparent to infrared radiation depending, of course, upon the wavelength of the infrared radiation and the thickness of the material.

The strip of film material 40 is relatively thin, i.e., between approximately 0.0005 and 0.001 inches, to minimize the attenuation of infrared radiation passing through the window 47 and to maximize the radiation sensed by the sensor in the probe 12. The body member 16, on the other hand, may be made of a material thicker than the film material 40, i.e., in the order of approximately between 0.015 and 0.050 inches. The insert 140 and the body member 116 have thicknesses similar to the film material 40 and the body member 116 respectively.

Figure 5:
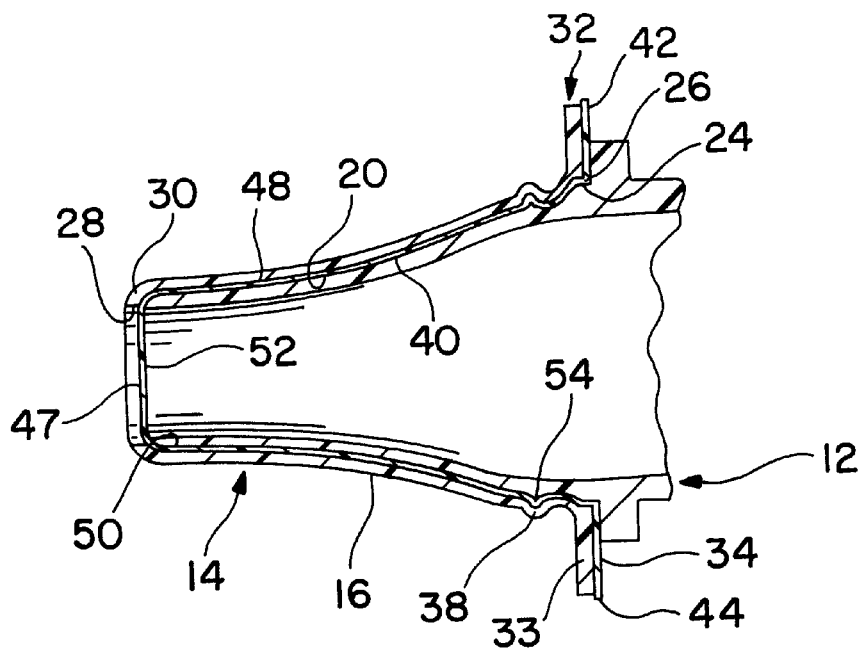
FIG. 5 is an enlarged broken vertical cross-sectional view of the probe cover secured over to the probe of an infrared thermometer.

FIG. 5 shows the probe cover 14 secured and mounted over the probe 12 of the thermometer 10 in a relationship where the probe outer surface 48 is in abutting relationship with the probe cover interior surface 20, the probe distal infrared transparent end 50 is in abutting relationship with the film material 40 on the interior surface 20 of the cover 14, the probe distal end opening 52 is aligned and in registry with the probe cover distal end opening 28 and the window 47 formed by the film material 40, and the rib 38 on the cover 14 engages with a complementary nipple 54 extending circumferentially around the probe outer surface 48 to interlock or snap-fit the cover 14 to the probe 12.

In its engaged position over the probe 12, the cover 14 and the film material 40 forming the infrared radiation transparent window 47 act as sanitary barriers which provide a clean, sanitary thermometer surface and keep the probe distal end opening 52 free of ear wax and the like matter which would interfere with the sensing of infrared radiation. The campanulate film insert 140 provides the same advantages.

What has thus been described is a probe cover where a film insert forming the probe cover's transparent infrared radiation window is easily and efficiently securable to the interior of the probe cover in an assembly step following the molding of the body member. The location of the film insert on the interior surface eliminates the risk of discomfort resulting from the presence of a seam and the risk of separation from the cover as in prior art covers where the film material is bonded to the exterior of the cover.

I claim:

1. A cover for a probe of a radiation detecting thermometer having an infrared transparent end, the cover comprising a unitary hollow sheath defining an interior surface, a proximal end opening sized for mounting said cover over the probe, a distal end opening in registry with the transparent end of the probe, and a separate infrared transparent film insert bonded to said interior surface of said sheath by an adhesive and occluding said distal end opening of said sheath, wherein said film insert comprises an elongate strip of a film material which extends around said interior surface of said sheath between said proximal and distal end openings of said cover respectively.

2. The cover of claim 1 wherein said cover includes an annular flange surrounding said proximal end opening and said strip of film material includes two opposed ends bonded to said flange.

3. The cover of claim 1 wherein said film insert has a campanulate part occluding said distal end opening of said sheath.

4. A cover for a probe of a radiation detecting thermometer provided with an infrared transparent end, the cover comprising a hollow body with an interior surface thereof defining a cavity, a proximal end opening for mounting said cover over the probe, and a distal end opening in registry with the infrared transparent end of the probe, said cover further comprising a separate campanulate and a transparent film insert comprising an elongate strip of a film material which extends around said interior surface of said sheath between said proximal and distal end openings and bonded to said interior surface of said body by an adhesive and covering said distal end opening.

5. The cover of claim 4 wherein said campanulate film insert includes a dome portion which occludes said distal opening of said cover and a body potion secured to said interior surface of said cover.

6. A method of making a cover for a probe of a radiation detecting thermometer comprising the steps of:

providing a sheath including an interior surface defining a proximal end opening and a distal end opening;

providing a film insert comprising an elongate strip of a film material which extends around said interior surface of said sheath between said proximal and distal end openings; and adhesively bonding said film insert to said interior surface of said sheath in a relationship wherein said film insert covers said distal end opening of said sheath.

7. The method of claim 6 further comprises the step of securing the strip of a film material to said interior surface of said sheath by wrapping and securing said elongate strip of a film material around said interior surface of said sheath in a relationship wherein opposed ends of the strip are generally diametrically opposed and are secured to said interior surface adjacent said proximal end opening thereof.

* * * * *